Patented July 19, 1927.

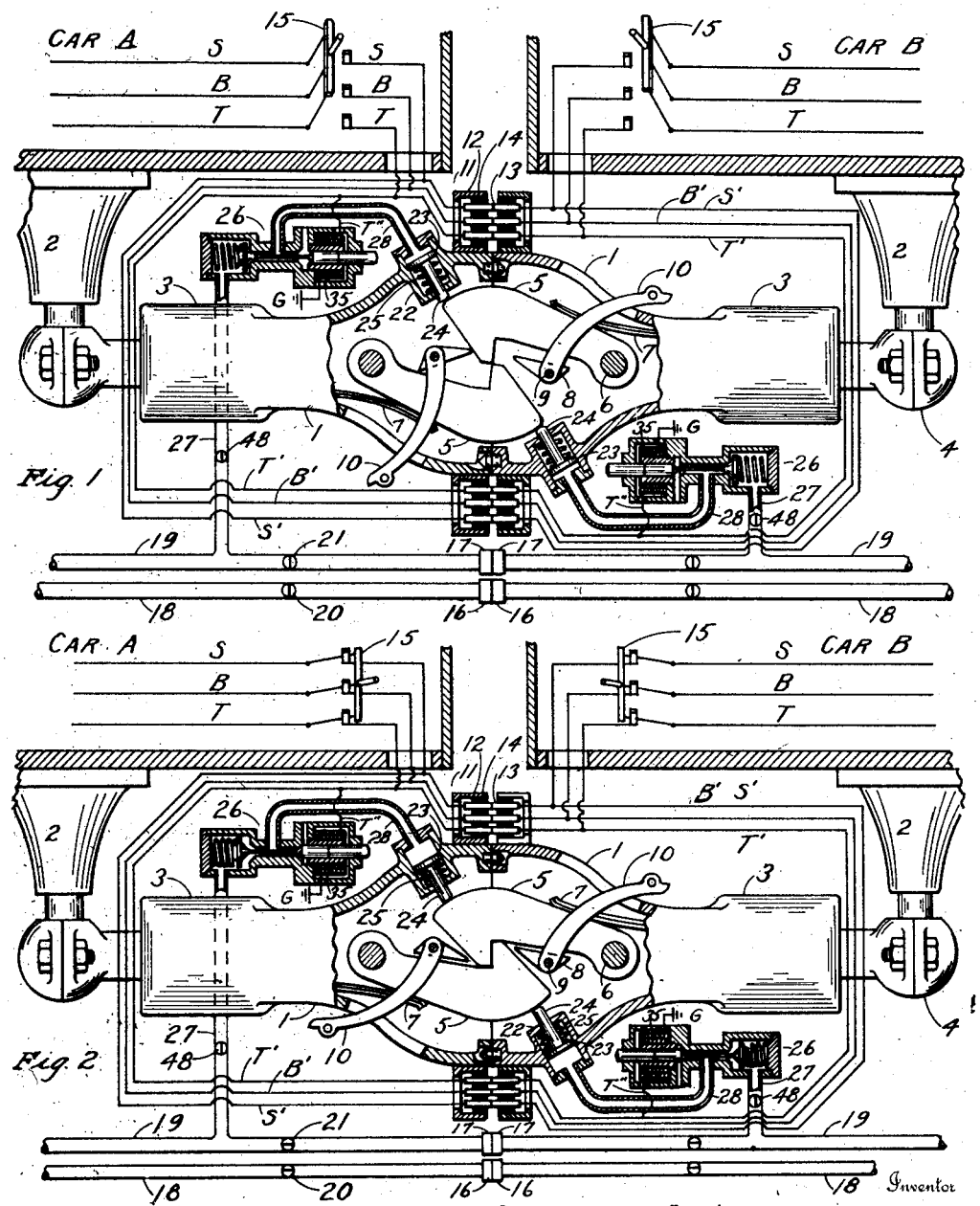

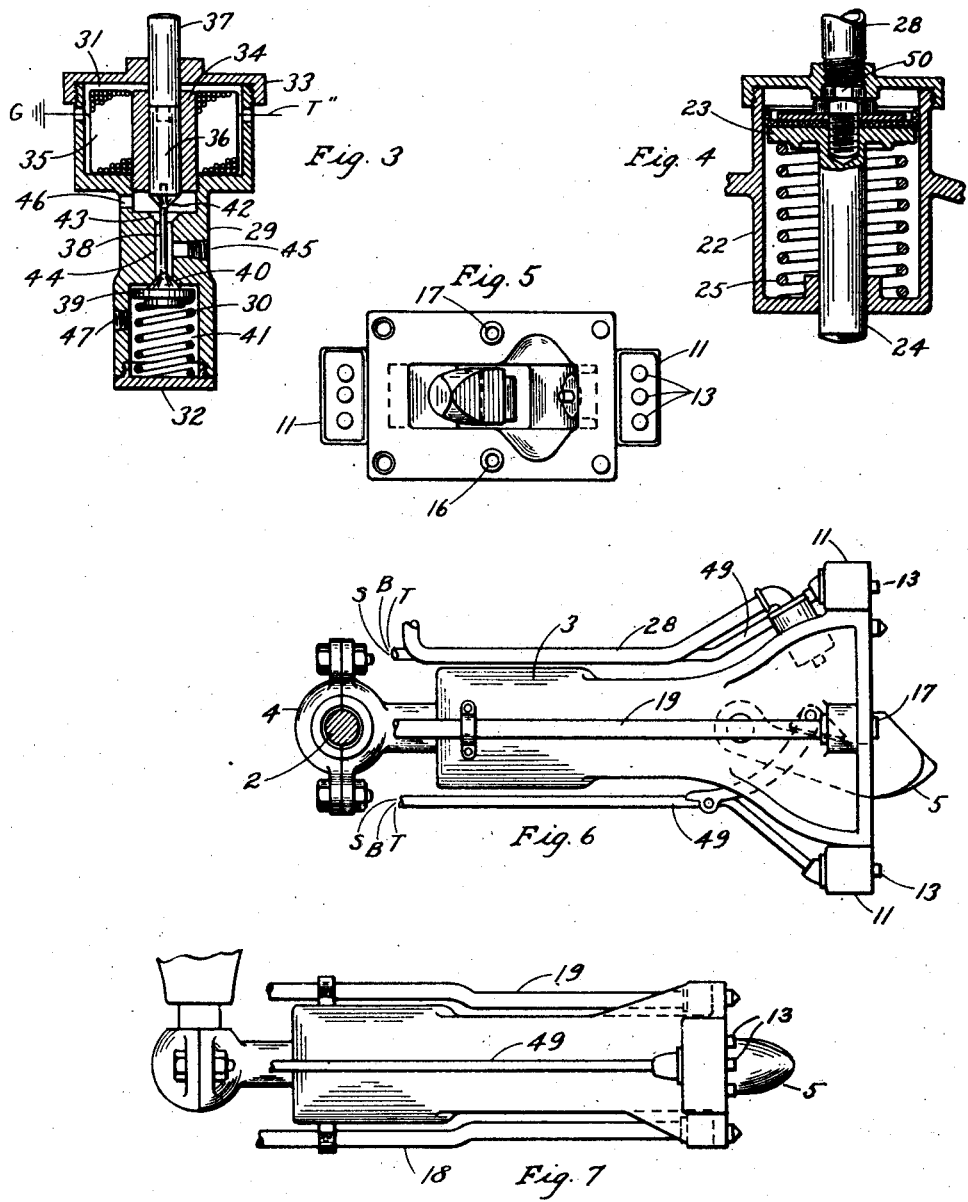

1,636,139

UNITED STATES PATENT OFFICE.

ERNST A. LARSSON, OF MANSFIELD, OHIO, ASSIGNOR TO THE OHIO BRASS COMPANY, OF MANSFIELD, OHIO, A CORPORATION OF NEW JERSEY.

CAR, AIR, AND ELECTRIC COUPLING SYSTEM.

Application filed September 19, 1924. Serial No. 738,591.

My invention relates to a car coupling mechanism and particularly relates to the coupling of cars which are equipped with air brake systems and electric circuits and means for connecting the air brakes and electric circuits of one car with those of the coupled car.

An object of my invention is to provide means for preventing two coupled cars from uncoupling or being uncoupled while the electric circuits between the cars are in an energized condition.

I am not describing any particular type of air brake system with which the cars are to be coupled as there are many types well known to those skilled in the art and in use at the present time, but to which my invention is applicable. My system is operable in connection with those systems in which there is a reservoir or air pressure supply line which extends from car to car and under normal operation is charged with air pressure. In connection with the air brake systems in use at the present time, as a rule, there is a circuit extending from car to car which is known as the brake line, and which controls the application of the brakes under normal operating conditions, and the entire system is so arranged that should the cars for any reason part while in normal operating condition there will be an emergency application of the brakes automatically applied. I am not limiting myself to any specific electric system with which my invention may be used, as there are many systems having electric circuits passing from car to car and which are coupled and uncoupled automatically with the making and breaking of the mechanical coupling, but I have shown my invention as combined with an electric system in which there are one or more charged circuits extending from car to car and automatically coupled and uncoupled upon the making and breaking of the mechanical coupling and which circuits are controlled through the electric couplers by means of switches upon each car so that when these switches are opened the contacts on the electric couplers will be de-energized.

My invention is so related to the air brake system that upon the closing of the switches controlling the electric circuits through the electric couplers, that air will be supplied to my invention from the air brake reservoir line and through proper mechanism will act upon the coupling mechanism to maintain the same in coupled relation as long as the switches controlling the electric circuits are closed and thereby preventing the uncoupling of the cars while the electric switches in the electric circuits are closed.

By this arrangement it is impossible for the car operator to uncouple and separate the cars while the contacts on the electric couplers are energized and therefore, a flash will be prevented which might be the means of causing trouble and at the same time the circuits are compelled to be rendered dead at the electric coupler before an uncoupling is made, and the contacts in the coupler will probably remain dead or de-energized thereafter and while the car may be operating as a single unit, and thus preventing danger to the public and workmen from exposed energized contacts in the coupler.

It will also be evident that while two cars are coupled in a normal operating condition, that my invention will prevent the inadvertent uncoupling of the cars through the coupling mechanism creeping apart.

My invention resides in the new and novel construction, combination and relation of the parts hereinafter described and shown in the accompanying drawings.

In the drawings:—

Fig. 1 is a schematic view of my invention as applied to two coupled cars A and B and is indicated as positioned upon the under side of the car adjacent the end, and as being provided with electric coupling mechanism, air coupling mechanism and mechanical coupling mechanism, control means for the air lines and electric lines respectively and mechanical coupling means, the elecrtic control means being shown in the open position and hence the electric coupler contacts will de-energize, the car coupling mechanism is shown in uncoupled relation and the air control means between the cars shown in a closed position. The position shows two coupled cars in condition to be moved apart into an uncoupled relation with de-energized electric contacts and with the air pressure circuits closed against leakage of air to the atmosphere.

Fig. 2 is a schematic drawing similar to Fig. 1, but showing the mechanical coupling mechanism in a fully coupled relation, the electric circuits connected and the controlling switches therein closed and the air brake pressure lines connected and the control valves therein open, all as would be the case under normal operation, and in addition the coupling hooks are held in a coupled relation by means of pneumatic pressure received from the air brake reservoir line.

Fig. 3 is an enlarged sectional view of an electro-pneumatic valve which I employ to control the flow of air from the reservoir line to the mechanism for holding the mechanical couplers in a coupled relation and preventing the uncoupling of the same.

Fig. 4 is an enlarged sectional view of an air cylinder and plunger which is controlled by the electro-pneumatic valve shown in Fig. 3, and which operates directly upon the coupling mechanism to prevent the same moving to an uncoupled relation.

Fig. 5 is a front view in elevation of the coupling mechanism and shows the relation of the mechanical, electric and air coupling devices.

Fig. 6 is a top plan view of the coupling mechanism.

Fig. 7 is a side view of the coupling mechanism shown in Fig. 6.

In the preferred embodiment of my invention I employ a car or mechanical coupling mechanism 1 secured to the forward end of a car by means of an anchorage mechanism 2 and which in turn is usually secured to the under surface of the car platform. The mechanical coupler 1 may be secured with a spring draft gear 3 which cushions the longitudinal movement of the coupling mechanism with respect to the car and which mechanism is well known to those skilled in the art and I have therefore, not shown this in detail as it is well known and forms no part of my invention. The mechanical coupler 1 and the anchorage mechanism 2 are shown as secured together by means of a universal or ball and socket joint 4. The mechanical coupler 1 is provided with a coupling hook 5 pivotally mounted on the pin 6 and positioned in a recess formed in the coupler head. The hook 5 is normally held in a coupled relation by means of the spring 7. To move the coupling hook 5 to an uncoupled relation mechanically, I employ a cam 8 mounted on the pin 9 and manually operated by the handle 10. When two couplers are in coupled relation, as shown in Fig. 2, and the handle 10 is operated to an uncoupled position, it acts upon the two cooperating coupler hooks 5 and moves each hook to an uncoupled position simultaneously, as shown in Fig. 1. The mechanical couplers 1 are so arranged that when brought together upon impact the hooks 5 projecting beyond the face of the couplers will cooperate with the opposite coupler to aline the same and these hooks will automatically engage with each other when the couplers have been brought into full engagement. This mechanical coupling operation is brought about automatically upon impact of the cars.

Secured to the coupling mechanism 1 are electric couplers 11 provided with a casing 12 and in which are mounted a plurality of electric contacts 13 which are insulated from each other and from the casing by means of the insulating material 14, and which are reciprocating in action and held in a forward position by means of a spring. I have shown these electric couplers as secured to the opposite sides of the coupler head and as provided with three contacts. The electric couplers, if so desired, may be positioned along the top or bottom edge of the coupler. As shown, there is a circuit leading from each contact 13 and these circuits are marked T, B and S respectively, and they indicate, first, a trolley circuit for operating conditions is connected directly to the trolley or source of energy, second, a buzzer circuit which may be made use of by passengers for signaling the motorman or conductor and last, a signal circuit used by the conductor and the motorman only for signal purposes. The contacts 13 in the electric couplers 11 are so arranged that no matter how the cars may be coupled end to end, the individual circuits in one car will be connected to like circuits in the coupled car and in the disclosure made herein this is brought about by positioning the electric couplers on opposite sides of the coupling head and equal distance from the center thereof and then cross-connecting the corresponding contacts of the two heads as by means of the wires T', B' and S'. Interposed in the circuits T, B and S leading to the electric contacts 13, there is a switch 15 controlling the continuity of these circuits to the contacts 13 such that the opening of the switch 15 causes the opening of all of the circuits leading to the contacts 13. Also associated with the coupling mechanism are two air line coupling devices 16 and 17 to which are connected the brake line 18 and the reservoir line 19 respectively. Positioned in the line 18 is a valve 20 and in the line 19 a valve 21 for controlling the flow of air through the coupling devices 16 and 17. The reservoir line is usually connected to a source of supply, such as an electric air compressor, and is normally at all times charged with air pressure. Secured to the mechanical coupling is a cylinder 22 having mounted therein a piston 23 and piston rod 24, the latter secured to the piston 23 and positioned to engage with the coupling hook 5 on the opposite coupler when in its advanced position. When the coupling mechanism is in an uncoupled relation then the piston rod 24 is held in a retracted position by means of a spring 25 thereby being entirely out of operative relation with the coupling hook 5 when the cars are operating singly, or in a position if coupled, to be uncoupled.

The cylinder 22 receives the operating air pressure from the reservoir line 19 and the control of the flow of air is through the electro-pneumatic valve 26 which is connected to the reservoir line 19 by means of the pipe 27, and is connected to the cylinder 22 by means of the pipe 28. The electro-pneumatic valve comprises a metal casing 29 having a chamber 30 in one end and a chamber 31 at the other end, enclosed respectively by the caps 32 and 33. Positioned centrally of the chamber 31 is a tubular member 34 upon which is mounted an electric coil 35 which has one end T'' connected to the car circuit T, and the other end connected to the ground G. Operating within the channel, through the tube 34, is a guide 36, preferably of non-magnetic material, to the outer end of which is secured a magnetic core 37 which is acted upon by the coil 35 when energized, and drawn inwardly. To the inner end of the guide 36 is a small rod 38, to the lower end of which and in the chamber 30 is mounted a valve 39 which engages a seat 40 and is held in engagement with the seat 40 by means of a spring 41 whenever the coil 35 is de-energized. The lower end of the guide 36 is provided with a valve 42 which engages the seat 43 whenever the coil 35 is energized. A passage 44 surrounds the rod 38 and to this passage is a connection 45 to which the pipe 28 is connected. The passage 44 connects with the passage 46 to atmosphere thereby relieving any air pressure which may be within the cylinder 22 when the coil 35 is de-energized, and thereby permitting the spring 25 to retract the piston rod 24.

A passage 47 leads to the chamber 30 and the pipe 27 is connected to the passage 47 and to the source of air pressure supply 19. Mounted in the pipe 27 is a valve 48 for controlling communication in the pipe 27 and which is usually manually operated and its usual function is to cut off the air pressure supply to the electro-pneumatic valve 26 in case of emergency repairs, etc.

It is apparent that the electro-pneumatic valve 26 may be located wherever convenient, as for instance, within the car or underneath the car or it may even be combined with the car coupling mechanism 1, or it may be directly combined with the cylinder 22.

It will be apparent that it is not absolutely necessary that the cars A and B shall be equipped with an air pressure system for operating air brakes as a source of air pressure for any purpose will operate the pneumatic locking mechanism, providing they are designed to harmonize, but wherever there is air pressure upon a car it is usually and primarily used for the operation of air brake systems thereon.

It will also be evident that it is not necessary with the car coupling mechanism shown to have an air pressure system upon both cars, but an air pressure system upon the car A and equipped with my invention will be sufficient to prevent the uncoupling of the mechanism until the electric coupling devices 11 on the two cars are de-energized. The reason for this is that the uncoupling cam 8 is so arranged that it cooperates with both coupling hooks 5 to move the two simultaneously. If one coupling hook 5 is held against movement, it is quite apparent that this will prevent the movement of the uncoupling cam 8 and therefore, will prevent the movement of either coupling hook 5; therefore, the equipment of one car only with my invention and with the car coupling mechanism shown is sufficient to prevent uncoupling of the cars. In cases, however, where the uncoupling of the car coupling device on one car only is sufficient to allow the separation of the cars, then each coupling head should be equipped with my invention in order to fully protect against uncoupling.

It will also be apparent that it is not necessary to have the pneumatic systems on both cars coupled together, as at 16 and 17, unless the systems are for the operation of brakes which are, of course, applied from the forward car, but if both cars should be equipped with independent sources of air pressure supply, this would be sufficient for the operation of my invention on both cars, as the control of the air pressure to the cylinder 22 is brought about by the control of the electro-pneumatic valves 26 which are in turn controlled by the switches 15.

Fig. 4 is an enlarged view in section of the cylinder and pneumatically operated piston rod 24, and shows a port 50 communicating with the pipe 28 to allow air to enter the cylinder freely when the piston is in a retracted position.

In Fig. 6 is shown somewhat in detail the top plan view of the assembled relation of the parts composing the car, air and electric coupling devices and in addition to the parts already described, there are shown conduits 49 leading from the electric couplers 11 in which are placed the train line circuits S, T and B for protection. The rear end of the pipes and conduits 19, 20, 28 and 49 may be connected from there on by means of flexible tubing in case the coupling mechanism is supported to swing radially.

Fig. 7 shows a side view in elevation of the parts shown schematically in Figs. 1 and 2 so far as they relate to the coupling mechanism proper.

In describing the operation of my invention, I will confine the same to two cars for the sake of simplicity, although any number of cars may be equipped and coupled together and operate similarly to the two cars. As shown in Figs. 1 and 2, the cars A and B are each equipped alike with the car, air and electric couplers for coupling up the air and electric circuits of the two cars and for coupling the two cars together and maintaining them in coupled relation as well as the electric and air pressure systems. The car coupling devices are also equipped with the electro-pneumatic controlled locking device and each car is equipped with a manually operated switch for controlling the train line circuits leading to the electric couplers. Assuming that car A is the forward car in which the motorman is positioned and which under the simplest operation receives its current from an overhead trolley to which the train line circuit T is connected, it will be quite apparent that the circuit T will be energized whenever the car A is in normal operation, therefore, the switch 15 will control the energizing of the train line circuit T leading to the electric coupler on that car and also the train line circuit T on the car B up to its switch 15, and from there on the train line circuit T in the car B is controlled by the switch 15 in that car. Upon bringing the cars A and B together by impact, the electric coupling devices and the pneumatic coupling devices will be automatically coupled and held in coupled relation by the car coupling device 1. Upon closing the switches 15 on the cars A and B, the train line circuits will be completed between and through the cars and upon opening the valves 20 and 21 on the cars A and B, the pneumatic circuits will be completed between and through the cars. Upon the closing of the switch 15 in the car A, the circuit T, leading to the electric coupler 11, will be energized and likewise the circuit T' connecting the electric couplers 11 on the opposite sides of the coupling head. As soon as the circuits T and T' are energized by the closing of the switch 15 in the car A, the coils 35 in the cars A and B will be energized and this will be true whether the switch 15 in the car B is closed or not. The energizing of the coils 35 operates the electro-pneumatic valve 26 and permits a flow of air from the reservoir line 19 through the pipe 27, past the valve seat 40, through the passages 44 and 45 and the pipe 28 into the cylinder 22, thereby causing the piston rod 24 to be advanced into engagement with the coupling hooks 5, all as shown in Fig. 2. It will be observed that as long as the switch 15 in the car A is closed and therefore, the circuits T and T' are energized and there is pressure in the reservoir line 19, that there would be pressure upon the piston 23 and the piston rod 24 will be held in engagement with the coupling hook 5 of the cooperating coupling heads, and that under such conditions it will be impossible for an operator to move the coupling hooks to an uncoupled position, as shown in Fig. 1, by operating the handle 10, and it will also be impossible for the hooks to work to an uncoupled position of their own accord during operation of the cars, hence there can be no uncoupling and separating of the cars while the contacts 13 in the electric couplers are energized.

If only the car A is equipped with air pressure supply and the pneumatic locking device, it will still be impossible to uncouple the cars, as the pneumatic locking device on the car A will prevent the movement of the uncoupling cam on either car and hence will prevent the movement of the coupling hooks 5 in either car to an uncoupled relation. In order to uncouple the cars, it will first be necessary for the operator to open the switch 15 on the car A or the head car. This will de-energize the circuit T and T' leading directly to and connecting the electric couplers and will simultaneously de-energize the operating coils 35 and permit the electro-pneumatic valve to close as against the flow of air from the reservoir line, and will open up cylinder 22 to atmosphere and allow the retraction of the piston rod 23 through the tension in the spring 25. When this takes place, the operation of the uncoupling handle 10 on either car will permit the coupling hooks 5 to be moved to their uncoupled relation, as shown in Fig. 1.

It will be seen that if the cars A and B are each provided with an independent air pressure supply that the electro-pneumatic control device and piston rod 24 will operate when the switch 15 is operated in car A.

It will be understood in connection with Figs. 1 and 2 that they are schematic drawings to show in a general way the arrangement of the various parts constituting my invention with relation to each other and to two coupled cars, and that the various elements shown are more or less distorted, as for instance, the car coupler is shown in section and in a vertical relation to the car, while under normal conditions of actual operation the coupler would be used in a horizontal position, and it will also be noted that the air pressure lines are shown out of their true relation and other like variations will be apparent.

There are, of course, many modifications in my invention which will suggest themselves to one skilled in the art and hence I do not wish to be limited otherwise than by my claims.

1. In a coupling system, the combination with an electric coupler and an air coupler of a car coupler and pneumatic means to prevent the car couplers uncoupling while the electric couplers are energized.

2. In a coupling system, the combination with a combined electric coupler and air coupler of a mechanical coupler to hold the electric and air couplers in coupled relation and pneumatic means to prevent the mechanical couplers uncoupling while the electric couplers are energized.

3. In a coupling system, the combination with an electric coupler and an air coupler of a car coupler holding the electric and air couplers in coupled relation and electro-pneumatically controlled means to prevent the car couplers uncoupling while the electric couplers are energized.

4. In a system of car, air and electric coupling devices on two cooperating cars of pneumatic operated means to prevent the separation of the coupling elements while the electric coupling device is energized and means to de-energize the electric coupling device at will.

5. In a system of car and electric coupling devices on two cooperating cars, the combination therewith of pneumatic operated means to prevent the uncoupling of the car coupling devices while the electric coupling devices are energized, a source of air pressure supply and means automatically controlling the air to the pneumatic means, depending upon the electric coupling devices being energized or de-energized.

6. In a system of car, air and electric coupling devices on two cooperating cars, the combination therewith of pneumatic operated means to prevent the uncoupling of the car coupling devices while the electric coupling devices are energized, means automatically controlling the air to the said pneumatic means, depending upon the electric coupler devices being energized or de-energized and means to control the energizing of the electric couplers.

7. In a system of coupling two cars equipped with an electric train line circuit, the combination of electric couplers for connecting the train line circuit on the two cars, car couplers for coupling and maintaining coupled the cars and the electric couplers, and electro-pneumatically controlled means to prevent the uncoupling of the car couplers while the electric couplers are energized.

8. In a system of car and electric coupling devices on two cooperating cars equipped with an air pressure system, the combination therewith of pneumatic means connected to the air system to prevent uncoupling the car coupling devices when the electric coupling devices are energized.

9. In a system of car and electric coupling devices on two cooperating cars equipped with an air pressure system, the combination therewith of pneumatic means connected to the air system to prevent uncoupling the car coupling devices when the electric coupling devices are energized and electro-pneumatic means to control the air to the pneumatic means and prevent the uncoupling of the car coupling devices when the electric coupling devices are energized.

10. In a system of car and electric coupling devices on two cooperating cars equipped with an air pressure system, the combination therewith of pneumatic means connected to the air system to prevent uncoupling the car coupling devices when the electric coupling devices are energized, electro-pneumatic means to control the air to the pneumatic means and prevent the uncoupling of the car coupling devices when the electric coupling devices are energized and means controlling the operation of the electro-pneumatic device.

11. In a system for controlling the coupling of cars, electric circuits and fluid pressure lines for trains; coupling means operable by the movement of the cars for automatically coupling and holding the cars, electric circuits and fluid pressure lines in coupled relation; controlling means for the electric circuits for making or breaking the circuits; controlling means for the coupling means to prevent the premature uncoupling of the said coupling means and connecting means between the controlling means for the electric circuits and the controlling means for the coupling means to insure the opening of the electric circuits prior to the uncoupling of the cars.

12. In car, air and electric couplers the combination with a mechanical coupling which is interlocked upon impact of the coupler heads, of air connecting means and electric connecting means comprising contacts engaged upon impact and circuits leading therefrom, both of which cooperate with corresponding parts when the mechanical coupling is made, locking means to prevent the uncoupling of the mechanical couplers and brought into action when the electric contacts are energized and means to energize the contacts.

13. In a system of car and electric coupling devices on two cars, the combination with the car connecting means of air operated locking means to prevent the car connecting means uncoupling, electric circuits leading to the electric coupler and means to energize the circuits to the electric couplers and simultaneously set the locking means to prevent uncoupling while the electric couplers are energized.

14. A car coupler comprising in combination a head member, a coupling member secured thereto to interlock with a like device on a head coupled thereto, uncoupling means to move the coupling member to an uncoupled position and means to engage the coupling member on the cooperating head to prevent the movement of the coupling member on the cooperating head to its uncoupled position.

15. A car coupler comprising in combination a head member, a coupling member secured thereto to interlock with a like device on a head coupled thereto, uncoupling means to move the coupling member to an uncoupled position and pneumatic operated means to engage the coupling member on the cooperating head to prevent the movement of the uncoupling means on either head to move the coupling members on the two coupled heads to their uncoupled positions.

16. A car coupler comprising in combination a head member, a coupling member secured thereto to interlock with a like device on a coupled head and means to engage the coupling member on the head of a cooperating coupler to prevent the movement of the coupling member on the cooperating head to its uncoupled position.

17. A car coupler comprising in combination a head member, a coupling member secured thereto and adapted to interlock with a like member on a head coupled thereto and pneumatic operated means to engage the coupling member on the cooperating head to prevent the movement of the coupling member to its uncoupling position when coupled.

18. The combination with a pair of coupled car couplers provided with movable intercoupling members movable on both cars to effect an uncoupling of electro-pneumatically controlled means acting upon one of the members to prevent the uncoupling of the couplers.

19. In a system of car coupling devices on two cooperating cars, the combination therewith of pneumatic operated means to prevent the premature uncoupling of the cars and electrically controlled means to control the operation of the pneumatic operated means.

20. In a system of car coupling devices on two cooperating cars, the combination therewith of pneumatic operated means to prevent premature uncoupling of the cars and electrically controlled means to control the supply of air to the pneumatic operated means and to release the air therefrom at will of the car operator.

21. In a system of car coupling devices on two cooperating cars, the combination therewith of pneumatic operated means to prevent premature uncoupling of the cars, the pneumatic means moved to a locking position by air pressure and to an unlocking position by a spring and electrically operated means to control the air to the pneumatic operated means.

22. In a system of car coupling devices on two cooperating cars, the combination of a source of electric power and air pressure, pneumatic operated means to prevent premature uncoupling of the cars, an electro-pneumatic device to control the air pressure to the pneumatic device and a switch to control the operation of the electro-pneumatic device.

23. The combination with a pair of coupled car couplers provided with hand operated means to move the coupling means to an uncoupled relation, of a pneumatic lock to prevent the operation of the hand uncoupling means and electrically controlled means to control the operation of the pneumatic lock.

24. In a system of car coupling devices on two cooperating cars each provided with an electric and an air circuit, the combination therewith of pneumatic operated means to prevent premature uncoupling of the cars said means receiving air from the air circuit, a switch to control the electric circuit, a valve to control the air to the pneumatic means, means interconnecting the switch and valve to control the operation of the valve to open the valve when the switch is closed and to close the valve when the switch is open.

25. In a car, air and electric coupling system on two cooperating cars, the combination therewith of pneumatic operated means to prevent the premature uncoupling of the cars, an electric switch controlling the electric coupling system, an electro-pneumatic valve controlling the pneumatic means, the valve and switch means interconnecting to open the valve when the switch is closed and to close the valve when the switch is open to admit air to the pneumatic means when the switch is closed to prevent uncoupling of the cars and vice versa.

In testimony whereof I affix my signature.

ERNST A. LARSSON.